United States Patent
Bruck

(10) Patent No.: US 10,384,285 B2
(45) Date of Patent: Aug. 20, 2019

(54) METHOD OF SELECTIVE LASER BRAZING

(71) Applicant: Siemens Energy, Inc., Orlando, FL (US)

(72) Inventor: Gerald J. Bruck, Titusville, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 388 days.

(21) Appl. No.: 15/054,603

(22) Filed: Feb. 26, 2016

(65) Prior Publication Data
US 2017/0246698 A1 Aug. 31, 2017

(51) Int. Cl.
| | | |
|---|---|---|
| B23K 1/005 | (2006.01) | |
| B23K 26/342 | (2014.01) | |
| B23K 10/02 | (2006.01) | |
| B23K 15/00 | (2006.01) | |
| B23K 35/30 | (2006.01) | |
| B23K 1/00 | (2006.01) | |
| B23K 26/082 | (2014.01) | |
| B29C 64/153 | (2017.01) | |

(Continued)

(52) U.S. Cl.
CPC .......... B23K 1/0056 (2013.01); B23K 1/0018 (2013.01); B23K 10/027 (2013.01); B23K 15/002 (2013.01); B23K 15/0086 (2013.01); B23K 15/0093 (2013.01); B23K 26/082 (2015.10); B23K 26/342 (2015.10); B23K 35/3033 (2013.01); B29C 64/153 (2017.08); B23K 2101/001 (2018.08); B33Y 10/00 (2014.12)

(58) Field of Classification Search
CPC .. B23K 1/0056; B23K 26/342; B23K 10/027; B23K 15/0086; B23K 35/3033; B33Y 10/00

USPC ... 219/76.16, 117.1, 121.64, 121.65, 121.66, 219/121.68, 121.73, 121.75
See application file for complete search history.

(56) References Cited

U.S. PATENT DOCUMENTS

| | | | |
|---|---|---|---|
| 2010/0081558 A1 | 4/2010 | Taylor | |
| 2013/0316183 A1* | 11/2013 | Kulkarni, Jr. | ........... B23P 6/007 428/557 |
| 2015/0129564 A1 | 5/2015 | Kadau et al. | |

(Continued)

FOREIGN PATENT DOCUMENTS

WO 2014074947 A2 5/2014

OTHER PUBLICATIONS

Deutsche Norm, "DIN ISO 857-2: Schweißen und verwandte Prozesse—Begriffe—Teil 2: Weichlöten, Hartlöten und verwandte Begriffe (ISO 857-2:2005)", ICS 01.040.25; 25.160.50, welding and allied processes—vocabulary—part 2: soldering and brazing processes and related terms (ISO 857-2:2005), soudage et techniques connexes—vocabulaire—partie 2: termes relatifs aux procedes de brasage tendre et de brasage fort (ISO 857-2:2005), März 2007 / Mar. 1, 2007.

(Continued)

*Primary Examiner* — Phuong T Nguyen

(57) ABSTRACT

A method of selective laser brazing is provided. The method includes providing a powder including a plurality of parent core particles and a plurality of braze particles, setting a temperature of an energy source, applying the energy source to the powder, and allowing the heated powder to solidify. The plurality of parent core particles are fused together by the plurality of braze material into a desired component.

17 Claims, 2 Drawing Sheets

(51) Int. Cl.
   *B33Y 10/00*      (2015.01)
   *B23K 101/00*    (2006.01)

(56) References Cited

U.S. PATENT DOCUMENTS

2015/0181685 A1* 6/2015 Sekhar ................ H01J 37/3233
                                                            427/569
2015/0337671 A1* 11/2015 Strock ...................... C09K 3/14
                                                            416/241 R

OTHER PUBLICATIONS

Examination Report From German Patent and Trademark Office; File No. 10 2017 103 650.4; Apr. 3, 2019; Zweibrückenstraße 12, 80331 München, Germany; 12 pages German and English translation.

* cited by examiner

METHOD OF SELECTIVE LASER BRAZING

BACKGROUND

1. Field

The present application relates to the manufacturing of components as well as to gas and steam turbines, and more particularly to a method of selective laser brazing.

2. Description of the Related Art

Additive Manufacturing, or 3-D printing, has recently been successfully used to 'print' or manufacture components directly layer by layer. This manufacturing technology enables the optimization of component design. Additive manufacturing of components includes a wide range of materials and process techniques. Two process techniques include selective laser sintering (SLS) and selective laser melting (SLM). Selective Laser Sintering (SLS) is an additive manufacturing technique that uses a laser as the power source to sinter powdered material, aiming the laser automatically at points in space defined by a three dimensional model, binding the material together to create a solid structure. Selective Laser Melting (SLM) is an additive manufacturing process that uses a three dimensional model and energy in the form of a high-power laser beam, to create the solid structure by fusing the metal powders together in the molten state. The main distinction between Selective Laser Sintering and Selective Laser Melting is that with sintering the material is not melted but is heated to the point that bonds form between particles by diffusion, while with melting, the particles are completely melted and fuse together in the molten state.

Both of these techniques, Selective Laser Sintering and Selective Laser Melting have disadvantages. For example, with Selective Laser Sintering, a fully dense component may not be achieved. After the Selective Laser Sintering process is complete, voids may exist between the particles requiring an additional process step, for example hot isostatic pressing (HIP), to press the particles together removing the voids. With Selective Laser Melting, each particle is melted and upon resolidification forms a particular crystal structure, size, and/or orientation which may not be optimized for the component. In particular, when applying the laser beam in the Selective Laser Melting technique, a layer of particles of a substrate is completely melted. Upon resolidification, the orientation of the crystal microstructure in the substrate that is melted in the process may be directional such that the properties of the layer may be different in the vertical direction than the horizontal direction. For example, the tensile strength of the layer after resolidification may be stronger in the horizontal direction as opposed to the vertical direction. A technique that would fuse the particles together without melting of the substrate material resulting in full densification and strength achievement is desired.

SUMMARY

Briefly described, aspects of the present disclosure relate to a method of selective laser brazing.

A method of selective laser brazing is provided. The method includes providing a powder including a plurality of parent core particles and a plurality of braze particles, setting a temperature of an energy source, applying the energy source to the powder, and allowing the heated powder to solidify. The plurality of parent core particles are fused together by the plurality of braze particles into a desired component.

DETAILED DESCRIPTION

Figure 1:
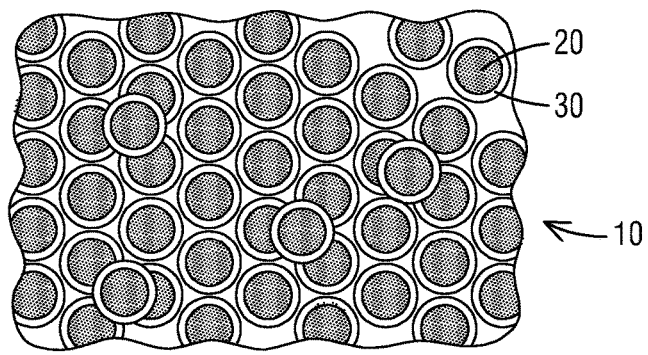
FIG. 1 illustrates parent core particles coated with braze material.

In order to overcome the disadvantages cited in the Background Section when using a selective laser process such as Selective Laser Sintering and Selective Laser Melting, an intermediate temperature method, Selective Laser Brazing is proposed. Brazing may be defined as a process that produces a coalescence of materials by heating them to a temperature in the presence of a filler material having a melting point above 450° C. (liquidus) and below a melting temperature (solidus) of the substrate material. Upon the application of heat from an energy source such as a laser, the filler material flows between the substrate material and is distributed by capillary action. This technique may be defined as an intermediate temperature process as the temperature used may be higher than a temperature used in laser sintering, but below that used when melting a layer of the substrate material.

To facilitate an understanding of embodiments, substrates, and features of the present disclosure, they are explained hereinafter with reference to implementation in illustrative embodiments. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Referring to FIGS. 1-6, a method of selective brazing is provided. In an embodiment, a powder 10 including a plurality of parent core particles 20 and a plurality of braze material or particles 30 is prepared. Braze material may be defined as braze particles fused together after having been melted (liquidus). The temperature of an energy source 170 is set. The energy source 170 is then applied to the powder 10. The heated powder is allowed to solidify. Programmed data stored in a scanner system, for example, enable a laser to additively manufacture a component 130 layer by layer. The layer by layer laser scanning process uses repetitions of melting and solidification (akin to selective laser melting). As a result of the selective brazing method, the plurality of parent core particles 20 are fused together by the plurality of braze material 30 into a desired component 130.

In the embodiment illustrated in FIG. 1, the powder 10 is prepared by coating the plurality of parent core particles 20 with a plurality of braze material 30 such that there is an essentially uniform distribution of braze material surrounding the parent core particles 10. Such coating may be achieved by methods known in powder coating preparation including chemical vapour deposition and melting of braze material with an even mix of parent core particles followed by crushing to make coated powder.

Figure 2:
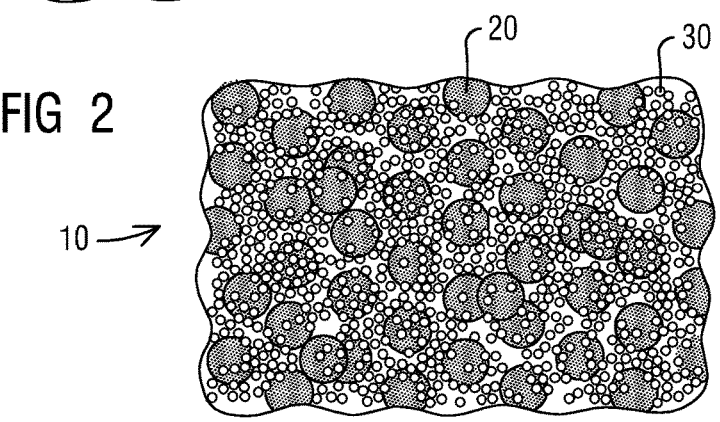
FIG. 2 illustrates parent core particles mixed with braze particles.

In another embodiment illustrated in FIG. 2, the powder 10 is prepared by mixing the plurality of parent core particles 20 with a plurality of braze particles 30. Due to the mixing, an essentially random mixture of parent core particles 20 and braze particles 30 results.

Figure 3:
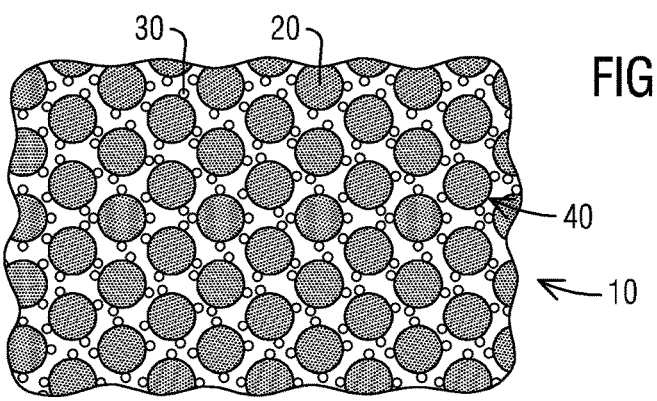
FIG. 3 illustrates braze particles disposed against parent core particles forming conglomerate particles.

In a further embodiment illustrated in FIG. 3, the powder 10 is prepared by disposing a plurality of braze particles 30 against each parent core particle 20 resulting in a plurality of conglomerate particles 40. Such disposition may be achieved by methods known in powder preparation including bonded powder where a binder glues particles together and composite powder agglomerated by pressure or heat (sintering). As seen in FIG. 3, the conglomerate particle 40 has a plurality of braze particles 30 disposed against it. However, the parent core particle 20 is not coated by the plurality of braze particles 30, i.e., there is not an essentially complete distribution of braze particles 30 surrounding the entire surface of each parent core particle 20.

Figure 4:
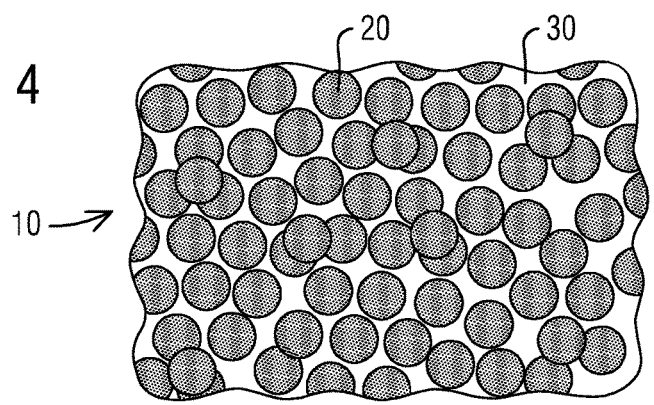
FIG. 4 illustrates parent core particles fused with brazed material after selective brazing.

In accordance to performing a brazing procedure as defined above, a temperature of an energy source 170 is set to a temperature above the melting point (liquidus) of the braze particles 30 but below the melting point (solidus) of the parent core particles 20 with the result that the braze particles 30 melt, but the parent core particles 20 do not melt. Thus, the melting point of the braze particles 30 is below that of the melting point of the parent core particles 20. Due to the melting of the braze particles 30 and the distribution of melted braze material by capillary action to surround a group of parent core particles 20, the subsequently solidified braze material 30 fuses the plurality of parent core particles 20 together. FIG. 4 illustrates parent core particles 20 fused together by the melted and resolidified plurality of braze particles 30 after the selective brazing procedure applied to each of the preparation methods 1, 2, and 3 as described above.

Fine sized braze particles 30 each including a diameter in a range such as between 10 and 60 μm would include sufficient surface area to promote wetting and fusion by capillary action for the selective brazing procedure. Wetting may be defined as the ability of a liquid, for example, the melted braze particles 30, to maintain a contact with a solid such as the parent core particles 20 and to previously deposited substrate including solidified braze with embedded core particles.

In all of the embodiments shown in FIGS. 1, 2, and 3 the braze particles 30 will fuse together the parent core particles 20 after the melted braze material with heated core particle powder is allowed to solidify. A desired solid component 130 may be formed from the selective brazing method. However, in the embodiment, as shown in FIG. 1, where the parent core particles 20 are coated with the braze material 30, a more uniform distribution of braze material 30 may be disposed between the parent core parent core particles 20.

An embodiment of the method includes preparing relatively high temperature parent core particles 20 coated with braze alloy material 30. In this embodiment, the parent core particles 20 include a melting point that is above 2000° C. Table 1 includes some candidate materials for high temperature core particles 20 (substrate material) and a corresponding braze material 30. These powders may be of interest in additive manufacturing for high temperature applications. Some of these powders, such as nickel coated on yttria stabilized zirconia, may be used as thermal barrier coatings to additively apply to superalloy substrates. This table is exemplary and is not limiting. Numerous other examples are also possible.

TABLE 1

Candidate powders for selective laser brazing of components useful with high temperature core particles

| Braze (coating) | Liquidus (° C.) | Substrate (base material) | Solidus (° C.) |
| --- | --- | --- | --- |
| Nickel | 1455 | Yttria stabilized zirconia | ~2600 |
| Nickel | 1455 | Graphite | 3642 |
| Nickel | 1455 | W, Mo, $Cr_2O_3$, $Cr_3C_2$, WC, TiC, silica, etc. | Various |
| Ni—P (e.g. Ni—7.9P) | 890 | Diamond | 3642 |
| Ni—P (e.g. Ni—7.9P) | 890 | W | 3422 |
| Ni—P& Ni—B (e.g. ni—7.9P) | 890 | Si—C | 2730 |

The braze powder 10 including the plurality of braze particles 30 may also include a melting point suppressant to create a braze alloy. Melting point suppressants are used to reduce the melting point of a material. This may be desirable as a wider variety of materials may be used as the braze alloy including those materials whose melting points are relatively close to the material of the parent core particles 20. Examples of melting point suppressants are Boron, Phosphorous, and Silicon. As an example, Table 1 shows that a braze alloy of Nickel and Phosphorous includes a melting point of 890° C. while the melting point of Nickel alone is 1455° C. The Nickel-Phosphorous combination substantially lowers the melting point approximately 565° C. In this case, for the described selective brazing method, the temperature of the energy source may be set to a lower temperature to melt the Nickel-Phosphorous combination as compared to melting Nickel particles without a melting point suppressant. Following selective laser brazing, the component may be subjected to a post process heat treatment to diffuse melting point suppressant and to optimize properties.

The braze powder 10 may include a wetting agent to create a braze alloy. As described above, wetting is the ability of the braze particles to maintain contact with the parent core particles 20 so that the melted braze alloy flows well between the parent core particles and with the previously deposited substrate. Zirconium and Silicon are examples of wetting agents. Additionally, Silicon may be used as a melting point suppressant. Thus, Silicon may be used in the braze alloy to perform the dual functionality of a melting point suppressant as well as a wetting agent.

Figure 5:
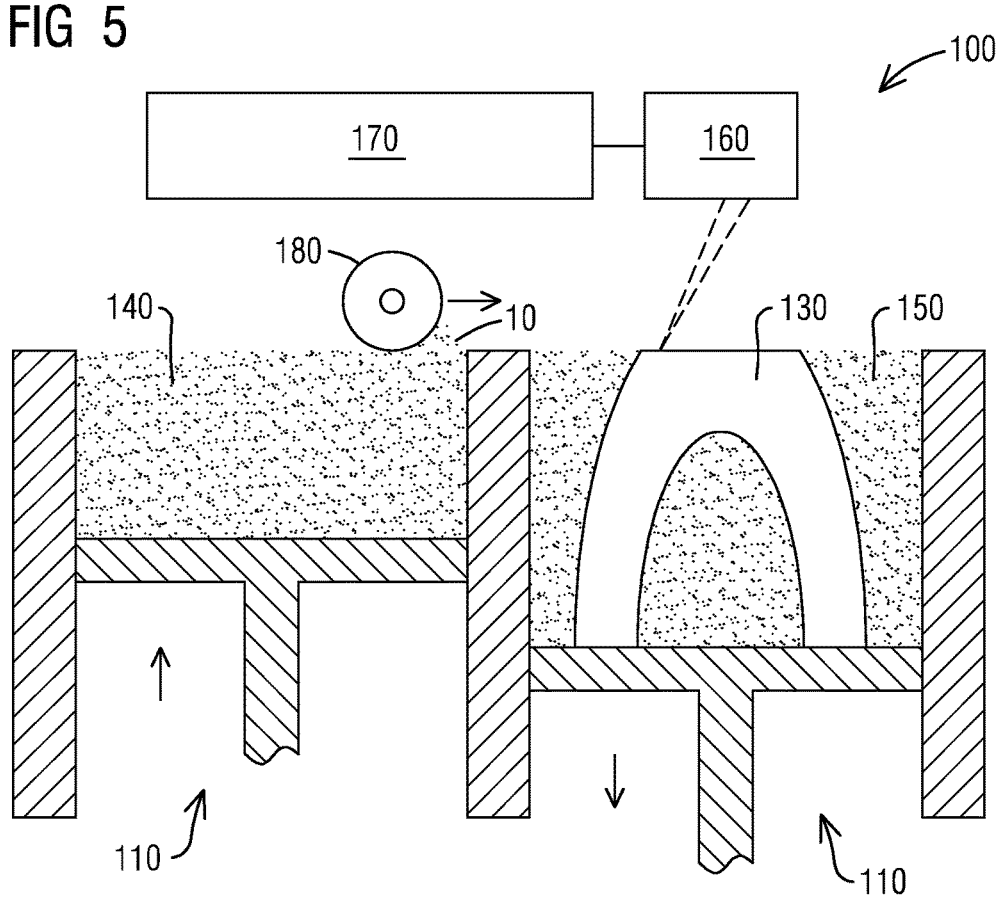
FIG. 5 illustrates an example of a selective laser process.

FIG. 5 illustrates a selective laser processing method 100 to additively create a component 130. A powder 10 is delivered to a surface by a powder delivery/fabrication piston 110 and a roller 180. The roller 180 moves a layer of powder 10 to a fabrication powder bed 150. An energy source such as a laser 170 is automatically aimed at a portion of the powder bed describing a point on the component to be created. The laser 170 will then scan a layer of the component 130. The portion of the powder bed 150 scanned corresponds to a layer of a three dimensional description of a component 130 being fabricated. After the layer is scanned, a delivery/fabrication piston 110 will move the fabrication powder bed 150 along with the component 130 down the thickness of a layer. The process is repeated for each layer of the desired component 130 until the fabrication of the component 130 is completed. The three dimensional description of the component 130 being fabricated may be stored in a scanner system 160.

For the selective brazing method, the powder 10 would comprise parent core particles 20 and braze particles/material 30. The laser 170 would be set to a temperature that is above the melting point (liquidus) of the braze particles 30 but below the solidus temperature of the parent core particles (substrate material) 20.

Figure 6:
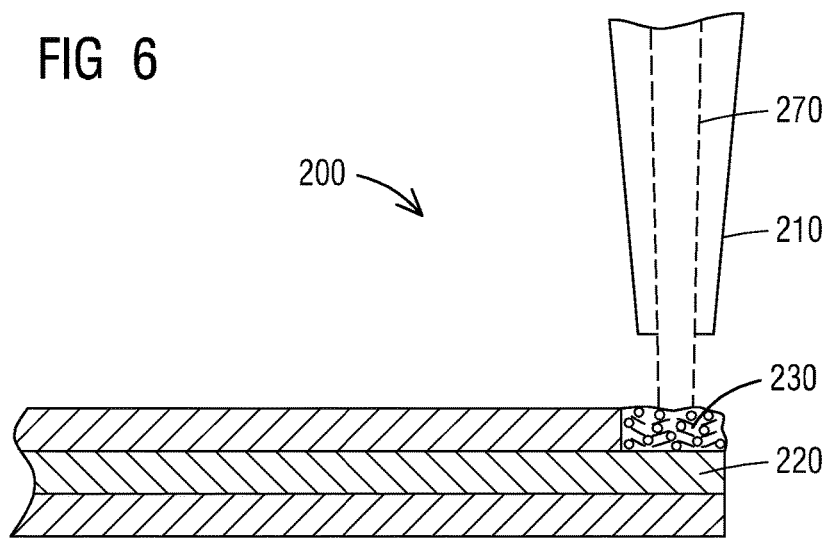
FIG. 6 illustrates a further example of a selective laser process.

While the selective laser processing method described in FIG. 5 may be used in an additive manufacturing method, the selective brazing method may also be used to create components from powder fed deposits instead of solely preplaced layer by layer. FIG. 6 illustrates a further selective laser processing method (200) that creates the component using powder feeding such that the process may be continuous and not accomplished layer by layer as shown in the process of FIG. 5. For example, the powder may be fed through a nozzle (210) onto a substrate (220) onto which an energy source (270), such as a laser, is focused. The braze particles in the powder would be melted by the laser (270) and distributed between the parent core particles creating a molten puddle (230) with molten braze and solid parent core particles as described above. After solidification, a resulting deposit of material may be formed which could be in a desired shape of a component.

In the embodiments shown in FIGS. 5 and 6, a laser 170 is used as the energy source. However, one skilled in the art would understand that other energy sources capable of attaining a temperature that could melt a plurality of braze particles 30 could be used for the selective brazing method. Other examples of energy sources may be a plasma arc beam or an electron beam.

While embodiments of the present disclosure have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A method of selective laser brazing, comprising:
preparing a powder including a plurality of parent core particles and a plurality of braze particles;
setting a temperature of an energy source to a temperature above the melting point (liquidus) of the braze particles and below solidus of the parent core particles;
applying the energy source to the powder at the set temperature so that the braze particles melt and distribute by capillary action between the parent core particles while the parent core particles do not melt; and
allowing the heated powder to solidify,
wherein the plurality of parent core particles are fused together by the solidified distribution of the plurality of braze material into a desired solid component.

2. The method as claimed in claim 1, wherein the preparing includes coating each of the plurality of parent core particles with a braze material.

3. The method as claimed in claim 1, wherein the preparing includes mixing the plurality of parent core particles with the plurality of braze particles.

4. The method as claimed in claim 1, wherein the preparing includes disposing braze particles against each parent core particle such that a plurality of conglomerate particles are formed.

5. The method as claimed in claim 1, wherein the plurality of parent core particles each include a diameter between 10 and 60 μm.

6. The method as claimed in claim 1, wherein the parent core particles includes a melting point that is above 2000° C.

7. The method as claimed in claim 1, wherein the applying includes scanning, with the energy source, a plurality of layers generated from a three-dimensional description of the component on the surface of a powder bed.

8. The method as claimed in claim 1, wherein the applying includes focusing the energy source onto the powder which has been fed onto a substrate in order to create a deposit of material.

9. The method as claimed in claim 1, wherein the plurality of braze particles comprise nickel and the plurality of parent core particles comprise yttria stabilized zirconia.

10. The method as claimed in claim 1, wherein the plurality of braze particles comprise a braze alloy including a melting point suppressant material.

11. The method as claimed in claim 10, wherein the melting point suppressant material is selected from the group consisting of boron, phosphorous, and silicon.

12. The method as claimed in claim 11, wherein after the allowing, the method includes subjecting the component to a post process heat treatment to diffuse the melting point suppressant material.

13. The method as claimed in claim 1, wherein the plurality of braze particles comprise a braze alloy including a wetting agent material.

14. The method as claimed in claim 13, wherein the wetting agent material is selected from the group consisting of zirconium and silicon.

15. The method as claimed in claim 1, wherein the energy source is a laser beam.

16. The method as claimed in claim 1, wherein the energy source is a plasma arc beam.

17. The method as claimed in claim 1, wherein the energy source is an electron beam.

* * * * *